Oct. 27, 1970     S. E. THOMAS, JR     3,535,746

REUSABLE BAG FASTENER

Filed Nov. 7, 1966

INVENTOR.

STANLEY E. THOMAS, JR.

BY *Russell, Chittick, & Pfund*

United States Patent Office

3,535,746
Patented Oct. 27, 1970

3,535,746
REUSABLE BAG FASTENER
Stanley E. Thomas, Jr., Orchard Ave.,
Weston, Mass. 02193
Filed Nov. 7, 1966, Ser. No. 598,138
Int. Cl. B65d 63/00
U.S. Cl. 24—30.5       3 Claims

ABSTRACT OF THE DISCLOSURE

A twist on and off reusable bag fastener consists of a generally omega-shaped form with extended legs made from a flexible resilient thermoplastic such as polypropylene. The fastener when placed about the neck of the bag is locked in place by a simple twisting of the legs into an intertwined engaged position.

---

This invention relates to bag fastener or closure device formed from a unitary piece of plastic and so designed that it can be repeatedly used while still providing a tight seal. It is particularly useful for closing flexible plastic bags of the type used to package meats and bread. This fastener can be used for other purposes, however, such as the binding together and/or coding of wires.

In brief compass, the fastener of this invention is formed from a resilient thermoplastic such as a polypropylene and has, in a general way, an omega ($\Omega$) shape as formed, with the legs having facing concave portions, and each being adapted to engage the underside of the other when one is bent over and under the other leg. Preferably, the legs have protuberances at the ends that assist in the locking together of the legs and make it easier to manipulate the fastener with the fingers or to apply it with a machine.

The legs can be engaged by a simple twisting motion, and likewise can be easily disengaged by twisting in the opposite direction.

The present fastener is particularly suitable for the packing of food items. A housewife who has, for example, purchased a loaf of bread with a polyethylene film bag can readily open the bag, remove as many slices as she wishes, and tightly reclose the bag by reapplying the fastener. When the loaf is consumed, the bag can then be used to store other items such as leftovers.

Figure 1:
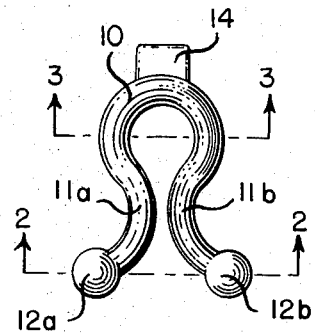
Figure 2:
Figure 3:
Figure 4:
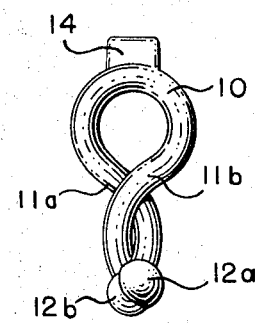
Figure 5:
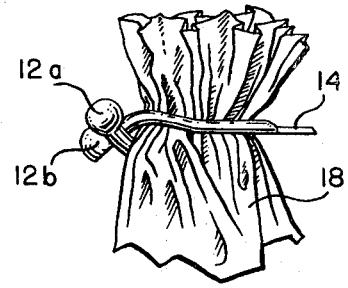
Figure 6:
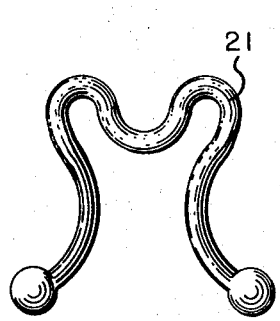
Figure 7:
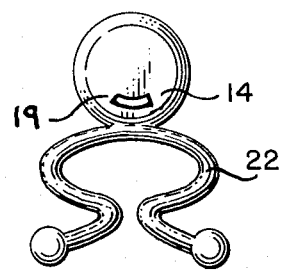
Figure 8:
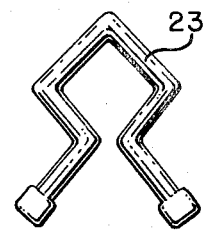

The nature and objects of this invention will become clear from the following description made with reference to drawings, wherein:

FIG. 1 is a plan view of one form of the fastener;
FIG. 2 is a cross-sectional view taken along the line A—A of FIG. 1;
FIG. 3 is another cross-sectional view taken along the line B—B of FIG. 1;
FIG. 4 is a plan view of the fastener of FIG. 1 in the closed position;
FIG. 5 is a side view of the fastener of FIG. 1 in the closed position about the neck of a bag 18;
FIG. 6 illustrates a modification of the fastener;
FIG. 7 illustrates another modification; and
FIG. 8 illustrates a third modification.

With reference to FIGS. 1 through 5, one form of the fastener consists of a unitary piece of a tough, but resilient thermoplastic, such as a polyethylene, generally indicated at 10, which can be formed as by injection molding. The upper portion is essentially a split ring that terminates in two legs, 11a and 11b, that curve inwardly towards each other, and then outwardly. The lengths of the legs are such that one can be twisted over and then under the other in a serpentine manner in a locking engagement.

While the legs can be round in cross-section, it is preferred that the whole of the fastener be flat on one side, with the body in the main portions being hemispherical in cross-section, as shown more clearly in FIGS. 2 and 3, as this creates edges, 15a and 15b, that assist one leg in engaging the other when twisted together. The semi-circular cross-section gives the fastener a greater resistance to bending in the common plane of the long axis of the fastener, which enhances the locking action of the legs, yet permits the legs to be readily rotated to some extent in the plane of the semi-circular cross-section. Also, this design allows the injection molding of the fastener in a one-sided cavity-split mold. As manufactured, the fasteners can be made in the form of a strip that contains several fasteners detachably attached together and is adapted to be introduced into a magazine of a fastening machine in a packing factory, e.g. See U.S. 3,164,250.

It is also preferred that the legs 11a and 11b terminate in protuberances 12a and 12b, which are hemispheres as illustrated. These protuberances assist in the locking action and also form points for finger engagement that do not have sharp edges. It has been found that if the fastener is placed on the bag with the flat surface pointing toward the opening of the bag the tendency of the fastener to slide on the bag is diminished.

With reference to FIGS. 4 and 5, the fastener is closed by twisting one of the legs, 11b as illustrated, over and slightly under the other. This twisting may in some, but not all, cases cause the other leg, 11a as illustrated, to rotate starting at about the mid-point of the enclosed circular area, so that axes of the hemisphere are about perpendicular and the flat face of one (12a) engages the side of the other (12b). As can be seen from FIG. 4, the overlapping of the legs causes the "eye" of the fastener to decrease in area, which gives a clamping action. The main ring forms approximately one complete turn of a helix.

The closure can be optionally provided with an integral tab 14 at its upper end. This tab serves as a convenient place to grasp the fastener, and also can be used for marking, pricing or coding purposes. It can be scored if desired at the base so that it can be readily broken-off.

A clasp as illustrated in FIG. 1 has been made from a molding grade polyethylene (Celanese's A60–500). Its length overall was about 1 inch; its width at the end of the legs was about ¾ inch and its thickness in the areas of the legs was about ⅟₁₆ inch.

As shown in FIG. 6, the main body of the fastener can have a shape other than the generally round shape shown in FIG. 1. As illustrated in FIG. 6, the upper portion 21 of the ring can be concave to enhance the locking action of the fastener, and as illustrated generally at 22 in FIG. 7, the opening or aperture of the fastener can be oval if need be to accommodate a certain type of bag. The tab 14 can advantageously have an arcuate aperture 19 formed in it to enhance the spring action of the entwining legs. With most plastics, it is preferred that the fastener design be such that it consists of smooth continuous curves. The high flex resistance polypropylenes, such as Avisun Company's 1016 permit more angular designs to be used such as is illustrated by fastener 23 in FIG. 8. It is only necessary that the plastic be flexible and resilient enough to permit repeated intertwining and lock of the legs, and yet have a sufficient resistance to cracking at the points of stress consistent with the intended use of the fastener.

In summary, this invention is a reusable bag fastener made of a resilient thermoplastic rod that defines an aperture and terminates in reversely outwardly turned ends or legs, the whole of the rod as made lying in the same plane, and being sufficiently flexible and resilient to permit said ends to be moved over each other into locking engagement in overlapping planes while reducing the aperture in area and placing the rod about the area into approximately one turn of a helix. It is preferred that at least the end of one of the legs have an enlargement thereon to facilitate the locking of the fastener.

Having described this invention, what is sought to be protected by Letters Patent is succinctly set forth in the following claims:

I claim:

1. A reusable bag fastener made of a bar of substantially resilient material of generally semi-circular cross-section that generally lies in the same plane and has a flat back side and an arcuate front side, forms a bag engageable aperture and terminates with outwardly turned flexible extensions adapted to be releasably locked together, said extensions in an unfastened position lying in the same plane and being convex towards but spaced apart from each other with outwardly turned ends, said bar being sufficiently flexible to permit such extensions to be moved over each other in an overlapping serpentine relation while said aperture is reduced in area until the ends thereof have passed each other to permit said extensions to be bent into crossing planes, said extensions upon release crossing each other in a locked position effected by friction engagement of the flat bottom side of one extension with the arcuate side of the other extension, and at least one of said extensions having an enlargement on the end thereof to facilitate the manual locking of the bag fastener.

2. The bag fastener of claim 1 wherein the fastener is made of a molding grade polypropylene resin and one side is flat.

3. The bag fastener of claim 1 wherein said enlargement is at least in part spherical and extends substantially above the top surface of the extensions.

References Cited

UNITED STATES PATENTS

| | | | |
|---|---|---|---|
| 503,683 | 8/1893 | Robertson | 24—256 XR |
| 548,947 | 10/1895 | Andal. | |
| 3,066,366 | 12/1962 | Wyckoff et al. | |

DONALD A. GRIFFIN, Assistant Examiner